Figure 1:
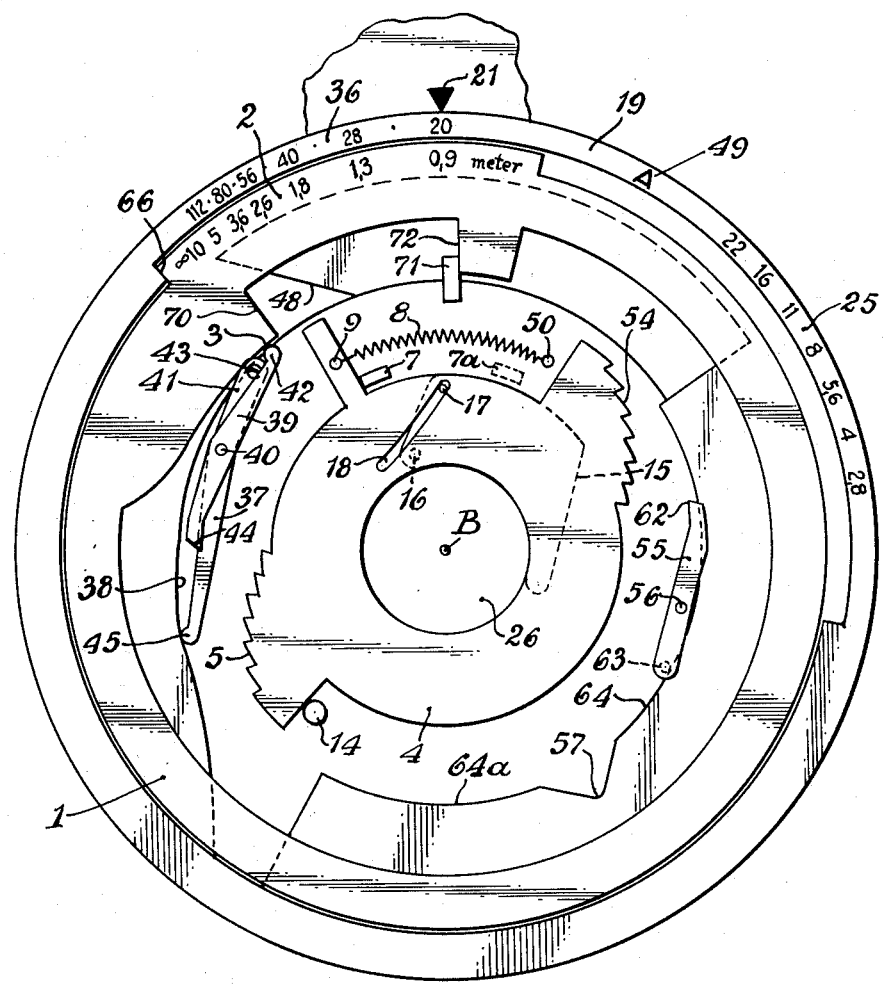

United States Patent Office 3,128,168
Patented Apr. 7, 1964

3,128,168
PHOTOGRAPHIC CAMERAS
Willi Günther, Stuttgart-Möhringen, and Heinz Köppen, Stuttgart, Germany, assignors to Zeiss Ikon Aktiengesellschaft, Stuttgart, Germany
Filed Jan. 15, 1962, Ser. No. 166,169
Claims priority, application Germany Jan. 21, 1961
4 Claims. (Cl. 95—64)

The invention relates to photographic cameras and particularly to a photographic camera, a photographic objective and a photographic shutter, all provided with an automatic flash exposure mechanism.

It is an object of the invention to provide a photographic camera, a photographic objective or a photographic shutter with a flash exposure mechanism which upon the selection and adjustment of flash bulb number and distance will automatically effect an adjustment of the diaphragm to the required aperture size without requiring the camera user to make any calculations or other thoughtful reflections.

Another object of the invention is to simplify flash exposure mechanisms used for photographic purposes, particularly those parts of the mechanism which automatically limit the distance adjustment in dependence of the flash guide number adjustment. This problem of the invention is solved in that the interval spacings of the guide number scale are made entirely or at least in part proportional to the distance adjusting scale and that a one sided abutment is arranged between the two adjustment members which are provided with the two mentioned scales. This mutual abutment is so arranged that upon reaching one of the two end diaphragm aperture values, preferably the smallest one, this abutment becomes effective to prevent any further relative movement of these adjustment members with respect to one another which would give a proportionate diaphragm aperture which can no longer be produced. This, in other words, means that after reaching one diaphragm aperture limit, particularly the smallest diaphragm aperture, any further adjustments of one of the adjustment members in such a direction that values are adjusted which at the limited diaphragm aperture proportion are no longer possible will cause the other adjustment member to move along with the one adjustment member so that the adjusted limit value remains the same. Accordingly, a number of paired diaphragm and shutter speed values which give always the same light value are moved past a common index which also is associated with paired flash guide numbers and distance values, the relation of which conforms to the well known flash exposure formula: Guide number=distance value×diaphragm value. If, for instance, a flash bulb of the guide number 80 is used in connection with a selected distance value of 10 meters, the required diaphragm value in accordance with the above equation will be f:8 so that the same diaphragm limit value is maintained, preferably the lower one. If on the other hand one prefers to arrange the mutual abutment of the two adjustment members on that end of the scales of the two adjustment members which has the greatest guide number and the greatest distance value, then the adjustment to a still higher guide number is not possible when the paired values of guide number and distance under the common index indicates already the smallest adjustable diaphragm aperture, because a still smaller diaphragm aperture having a greater diaphragm number would have to be available when the smallest distance value is to be maintained. Such a small distance, however, cannot be adjusted with the objective. The mutual abutment which in this case is effective between the two adjustment members does not permit a separate adjustment of the guide number ring toward higher guide numbers, but it permits an adjustment of the guide number adjustment member in this direction only under simultaneous movement with the distance adjustment member, and this has the result that paired values of guide number and distance are movable past the common index and these paired values when limiting the distance at the same time retain the smallest diaphragm aperture. An adjustment of the guide number adjustment member in the direction of the still available lower guide number is, however, possible.

Figure 3:
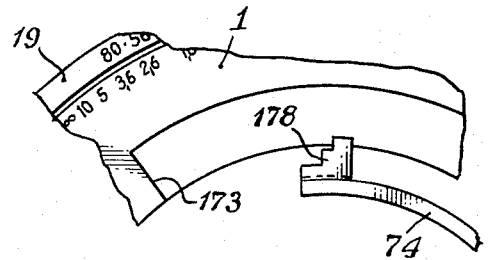
Figure 2:
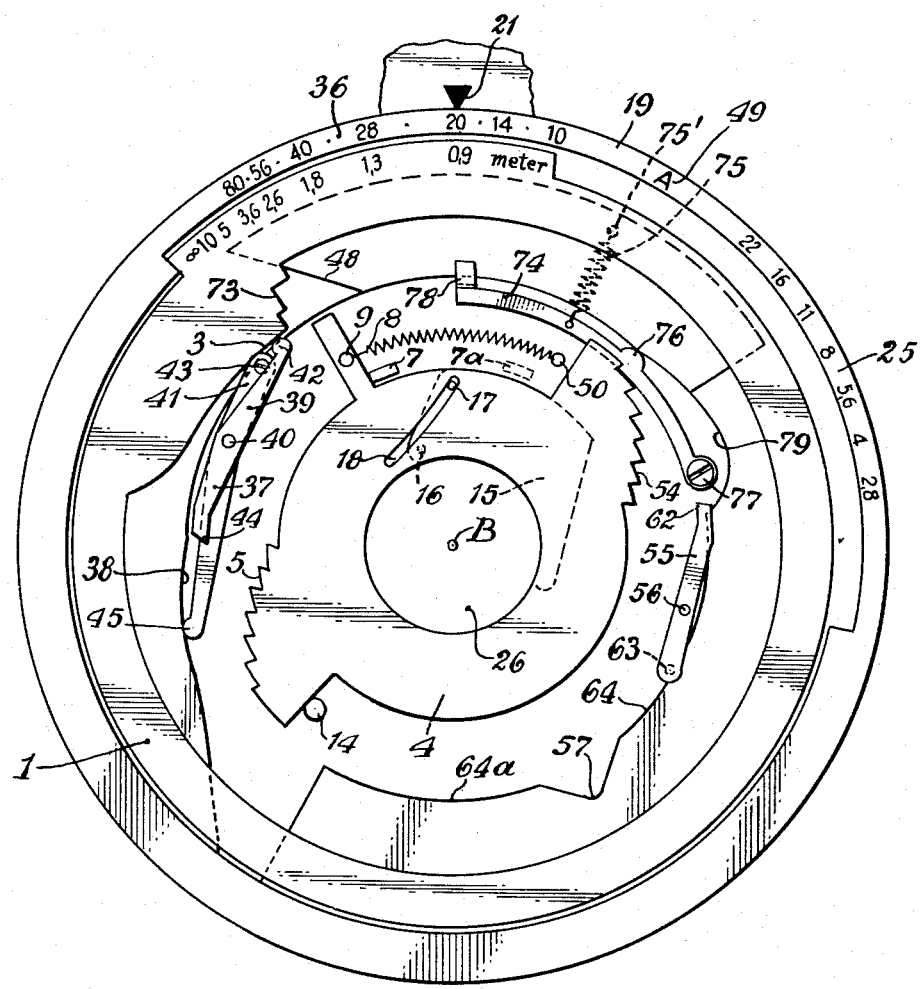
Figure 4:
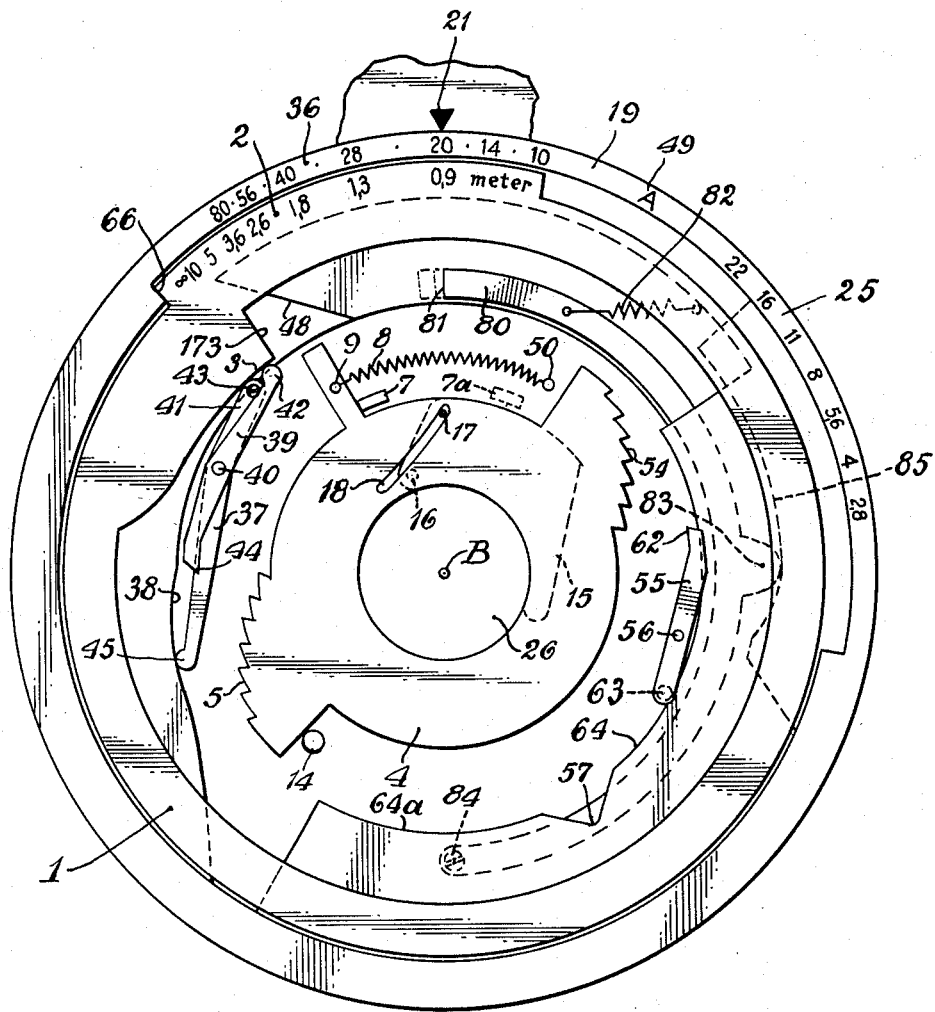

With these and other objects in view the invention will now be described in detail with reference to the accompanying drawings, in which FIG. 1 illustrates diagrammatically in a front elevation view an automatic flash exposure mechanism with only abutments, and the FIGS. 2, 3 and 4 illustrate in similar manner flash exposure mechanisms with changeable abutment systems.

Referring to FIG. 1, the flash exposure mechanism illustrated is provided with a change-over ring 19 which concentrically surrounds the axis B of the camera objective and is used for adjusting the camera for the various exposure mechanisms which selectively may be used, such as automatic flash exposure, automatic daylight exposure, and manually adjustable daylight exposure.

The change-over ring 19 has indicated thereon three circumferentially and serially arranged operating ranges, namely a flash guide number scale 36, a mark 49 such as an A indicating the automatic daylight exposure range, and a diaphragm scale 25 which is used when the camera is used for manually setting for daylight exposures. Each of these three ranges becomes operative when the ring 19 is rotated to bring the selected range into registration with a stationary index 21 arranged on the camera casing or another stationary camera part, such as an objective mount or the like.

When one of the scale values of the scale 36 is moved opposite the stationary index 21, the flash exposure range of the camera becomes effective; when the mark A is moved opposite the index 21, the automatic daylight exposure control of the camera becomes effective, and when one of the scale values of the diaphragm aperture scale 25 is moved opposite the index 21, the manual diaphragm adjusting device or the manual diaphragm preselector becomes effective. For a further explanation of the invention it is not necessary to describe in detail the devices which become operative when the mark A or any one of the scale values of the diaphragm scale 25 have been moved into their operative ranges. These two last named features are only mentioned as being available in the camera of the present invention in order to indicate that the camera is not only used for making flash exposures, but can also be used for making other types of exposures. Furthermore, the invention is not limited to the arrangement of the flash exposure mechanism in the camera casing because the flash exposure mechanism may also be arranged within the camera objective or within the camera shutter.

The camera is also provided with a distance adjusting ring 1 provided with a distance scale 2. The ring 1 in the same manner as the change-over ring 19 is arranged concentrically about the axis B of the camera objective. As illustrated, the change-over ring 19 and the distance adjusting ring 1 are arranged in a mutual abutment position which is established by a radial abutment 66 extending inwardly from the inner circumference of the change-over ring 19. In view of this abutment 66 it is not possible to rotate the change-over ring 19 alone in clockwise direction. On the other hand the distance adjusting ring 1 cannot be rotated alone in anticlockwise direction. However, both rings 19 and 1 may be rotated in the mentioned directions by taking the other ring along. In the illustrated embodiment of the invention the two rings 19 and 1 are shown as being positioned one within the other and therefore appear as having different diameters, while the scales of these rings are arranged opposite a common stationary index 21. In actual practice, however, the rings 19 and 1 have the same diameter and their scales are arranged one next to the other on outer cylindrical faces of these rings. The stationary reading index 21 is then arranged next to these rings 19 and 1.

According to FIG. 1, the guide number scale 36 is not provided, as heretofore customary, with a linear division but in accordance with one of the main objects of the present invention the interval spacings between the scale values are made non-uniform, namely in such a manner that they are proportionate to the interval spacings of the distance adjustment scale 2. In view of this arrangement another object of the invention is realized, namely one is able to operate with fixed abutments for the distance limitation and therewith with the associated limitation of the sizes of the extreme diaphragm apertures. In accordance with FIG. 1, the rings 19 and 1 have reached their abutting position (they engage the abutment 66). In this position the guide numbers and distance values are arranged in paired relation in accordance with the well known equation: Guide number=distance value × diaphragm value. If, for instance, a flash bulb of the guide number 80 is used in connection with a selected distance value of 10 meters, the required diaphragm value in accordance with the above equation will be $f:8$ and the smallest available diaphragm aperture which can be obtained is $f:22$. In this position it is necessary to avoid that the distance values are placed opposite higher guide number values, or in other words, a rotative movement of the change-over ring 19 in clockwise direction must be blocked. If for instance the guide number 28 could be moved opposite the distance value of .9 m., a diaphragm of $f:30$ would result, but this is not possible with the illustrated camera objective whose diaphragm aperture cannot be adjusted to this value. The same condition would exist when the distance adjusting ring 1 at any available smaller distance value could be rotated counter-clockwise. Such a possibility of going beyond the smallest diaphragm aperture is prevented by the abutment 66. The adjustment to higher guide numbers is only then possible when during the adjustment of the change-over ring 19 the distance adjustment ring 1 is taken along. In such a case paired values of guide number and distance would be moved past the index 21 and would result in the smallest diaphragm aperture of $f:22$.

The two rings 19 and 1 in the illustrated position may, however, be individually rotated in such a manner that larger diaphragm apertures are obtained up to the largest available diaphragm aperture. The limit adjustment in this case is the one in which the movement of the distance adjusting ring 1 relative to the change-over ring 19 will cause the guide number 20 to come to rest opposite the distance value of 7.1 m. This 7.1 m. position as such is, however, not indicated on the distance scale in view of the small spacing between adjacent scale values. These paired values, namely guide number 20 and distance value 7.1 m., will result in the greatest aperture of the diaphragm, i.e. $f:2.8$. A further rotation of the distance adjusting ring 1 in the same direction, however, has to be prevented since such a rotation would indicate a still larger diaphragm aperture which cannot be obtained in the present example. The blocking of the distance adjusting ring 1 in this limit position is obtained by a further abutment between the distance adjusting ring 1 and a stationary counter abutment 71. This additional abutment is formed by a radial shoulder 70 on the distance adjustment ring 1. In order to avoid that a certain limit distance, in this case the limit distance of .9 m., is not exceeded, the distance adjusting ring 1 is provided with still another radial shoulder 72 which is able to engage the other side of the abutment 71.

For forming a diaphragm aperture as a result of the adjustment of guide numbers and distance values, an intermediate member is arranged between the change-over ring 19 and the distance adjusting ring 1 on one hand and a diaphragm cage 4 on the other hand, which latter is provided with a series of abutment steps 5. The intermediate member consists in the illustrated embodiment of a lever combination 37, 39 which is controlled by control cams on the inner circumference of the change-over ring and on the inner circumference of the distance adjusting ring, respectively. The change-over ring 19 is provided with a control or operating cam 38, while the distance adjusting ring 1 is provided with a control or operating cam 3. The control cam 38 on the change-over ring 19 is provided in accordance with the non-uniform interval spacing of the guide number values with a suitable shape, while the control cam 3 on the distance adjusting ring 1 is also of a suitably constructed shape so as to correspond to the interval spacing between the values of the distance scale and the diaphragm scale.

The diaphragm cage 4 which is provided on its outer circumference with the aforementioned series of abutment steps 5 is so arranged that in the illustrated position of the diaphragm segments 15, of which only one is shown, the segments form the largest diaphragm aperture when the camera is tensioned. An actuating member 7 which is operated by the shutter tensioning device assumes the position indicated in dashed lines at 7a when the camera has been released, and when the camera is tensioned it is in the position 7.

The entire diaphragm adjustment range extends between these two positions 7 and 7a. The diaphragm control cage 4 which on one side is blocked by the member 7 when the camera is tensioned, is blocked on the other side by a stationary pin 14. A helical spring 8 is attached with one end to a stationary point 50 and with its other end to the diaphragm control cage 4 at a point 9 and has the tendency to pull the diaphragm control cage 4 into the direction forming the smallest aperture. Upon actuation of the camera release member the diaphragm control cage 4 returns in clockwise direction and depending upon how complete this return movement is, the diaphragm will be closed more or less. The closing movement of the diaphragm segment 15 which is rotatable about a pin 16 attached to a second diaphragm cage (not shown) effects a change in the size of the light passage aperture 26. This closing takes place during the return movement of the diaphragm control cage 4 in such a manner that the pin 17 supporting the pivotal movement moves downwardly in a slot 18 which is arranged in the diaphragm control cage 4 so that in accordance with the individual diaphragm intervals the closure steps are obtained which are indicated in the drawing.

The lever 37 of the aforementioned lever combination 37, 39 is pivotally mounted with its upper end 41 about a stationary pin 43. The lower end 45 of the lever 37 is urged by a not illustrated spring in engagement with the cam 38 on the inner circumference of the change-over ring 19. This lever 37 carries approximately in its center portion a pivot pin 40 on which the center portion of the second lever 39 is pivotally mounted. The lever 39 is also urged by a spring with its upper tracking end 42 in engagement with the cam 3 on the distance adjustment ring 1. The lower end 44 of the lever 39 is constructed in the form of an abutment point which is adapted to engage the series of abutment steps 5 provided on the diaphragm control cage 4. Into this lever combination 37, 39 are introduced not only the adjusted distance values but also the adjusted guide number values in such a manner that the lever 37 is actuated by the cam 38 on the change-over ring 19. This results in a displacement of the axis of the pivot pin 40 carrying the lever 39. The latter is subjected to the action of the cam 3 on the distance adjusting ring 1. Therefore, the lever 39 will be actuated under the influence of the adjusted guide number value to point toward the series of abutment steps 5 on the cage 4 and may also be moved away therefrom. Furthermore, in view of the adjusted distance value this lever 39 will change its angle of incidence with respect to the series of abutment steps 5.

The change-over ring 19 is also provided on its inner circumference with a disconnecting cam 48 which performs its intended function when the change-over ring 19 is rotated counterclockwise so that the automatic exposure range A or the manual diaphragm adjusting range, namely the scale 25, is shifted into operative position. During this counterclockwise rotation the disconnecting cam 48 on the ring 19 will engage the end 42 of the lever 39 and will rotate the latter clockwise so that the lower end 44 of the lever 39 can no longer come into engagement with the abutment steps 5. Such a rotation of the lever 39 is possible since this lever is arranged either above or below the plane in which the change-over ring 19 is located.

The diaphragm cage 4 is provided approximately opposite its abutment steps 5 with further abutment steps 54 which are adapted to come into cooperation with another lever 55 for the purpose of automatically changing the diaphragm aperture when the mark A comes into registration with the index 21, or in other words, when the automatic exposure device is put into operation.

The lever 55 is fixedly attached with its central portion to a shaft 56 which in turn is rotatably adjusted by an exposure meter or by a scanning mechanism operated by said exposure meter. The rotation of the shaft 56 may take place in the same manner as is described in the copending U.S. patent application of Heinz Köppen, Serial No. 156,740, filed December 4, 1961, and illustrated in FIG. 8 thereof.

The lever 55 is provided on its lower end with a tracking member 63 and on its other end with a point 62 which acts as a catch member as will be presently described. Depending upon the angle of incidence of the lever 55 with respect to the abutment steps 54 the diaphragm cage 4 is able to move rearwardly more or less in order to close the diaphragm more or less when the camera release member is actuated and the diaphragm cage 4 is released for rearward movement.

In order to obtain a free rotative movement of the lever 55 when the camera is adjusted for automatic daylight exposures, the ring 19 is provided on its inner circumference with raised cam portions 64 and 64a and therebetween with a deep curved recess 57 into which the lower end of the lever 55 may enter. Within the range of flash exposures and in the range of manual adjustment of the diaphragm the lever 55 is blocked against movement because its tracking member 63 is in engagement with one or the other of the raised cam portions 64 and 64a. Only when the camera is adjusted to the automatic exposure range A the lower end of the lever 55 will enter into the recess 57 and will thereby obtain a free movability so that the upper end 62 of the lever 55 may be moved into the path of movement of the abutment steps 54.

In view of the foregoing description it is believed that the operation of the arrangement illustrated in FIG. 1 is easily understandable. Depending upon the guide numbers and the distance values to which the rings 19 and 1, respectively, have been adjusted the lever 39 of the lever combination 37, 39 will be pivotally moved and shifted more or less so that the lower end 44 of the lever 39, upon release of the camera, may engage one of the abutment steps 5 and this engagement takes place the later the greater the adjusted guide number and the smaller the adjusted distance are selected. When the change-over ring 19 is rotated in clockwise direction from its illustrated position, guide numbers of greater value will move past the index 21, but this is only possible when in view of the one-sided abutment 66 the distance adjusting ring 1 is also rotated, or in other words, is taken along by the ring 19. This results in an adjustment of the distance and at the same time the camera user will be given paired values which prevent an adjustment beyond the predetermined smallest diaphragm aperture in a direction in which still smaller diaphragm apertures are not possible.

It should be noted that a free rotative adjustment of the change-over ring 19 and of the distance adjusting ring 1 in the direction in which the diaphragm aperture increases in size is possible, for instance in the present case up to a maximum aperture of $f:2.8$. The limit of the adjustment in the opposite direction is formed by the abutments 70, 71 which prevent a transgression over a predetermined distance adjustment which in the present instance is 7.1 m.

FIG. 2 discloses another embodiment of the invention in which the same reference characters are used for the same parts also employed in the embodiment of FIG. 1. FIG. 2 differs from FIG. 1 in this that the guide number scale 36 has been extended at one end (the right hand end) to show additional guide number values, namely the guide numbers 14 and 10. In view of the practical construction these guide numbers 14 and 10 are preferably spaced uniformly from one another and the right hand end of the scale 36. In this embodiment of the invention it is necessary to prevent that for instance the guide number 14 be moved opposite the distance of 7.1 m. and that the guide number 10 be moved opposite the distance of 5 m., because such combinations of guide numbers and distance values would result in a not possible diaphragm aperture of $f:1.2$. In order to prevent this, the abutments 70 and 71 employed in FIG. 1 are replaced by a variable abutment system which consists of a series of radially arranged abutment steps 73 on the inner circumference of the distance adjusting ring 1 and a counter abutment 78 arranged on a curved lever 74. The curved lever 74 extends substantially concentrically about the optical axis of the camera objective and is pivotally attached with one of its ends to a stationary pivot pin 77, and by means of a spring 75, one end of which is anchored to a stationary point 75′, the lever 74 is urged against a concave cam face 79 provided on the inner circumference of the change-over ring 19. The curved lever 74 is provided between its ends with an outwardly extending projection 76 which engages the concave cam face 79. Depending upon the position of the lever 74 as it is determined by the shape of the cam face 79 the abutment end 78 will come into engagement with one of the steps 73 in dependence of the adjusted guide number. The engagement takes place sooner or later depending upon which step of the series of steps 73 comes into engagement with the abutment end 78 of the lever 74. When this takes place, any further distance adjustment is blocked and the particular position of the abutment determines the greatest aperture ratio of the diaphragm which cannot be exceeded.

FIG. 3 illustrates a modification of the variable abutment system employed in the embodiment of FIG. 2 in that the series of abutment steps and the radial abutments are reversed. In other words, the distance adjusting ring 1 is provided with a single radial abutment step 173 while the pivotally mounted lever 74 is provided with a series of offset abutment steps 178.

In FIG. 4 is illustrated another embodiment of the abutment system in which the single radial abutment step 173, which is also used in FIG. 3, cooperates with the flat radial end face 81 of a pivotally mounted lever 80. As shown in dash and dotted lines, this lever 80 is so controlled that its end face 81 may assume various positions spaced a different distance from the abutment step 173. In order to obtain this desired result, the lever 80 has been given the shape substantially of a semi-circle which concentrically surrounds the axis of the camera objective and one end of this curved lever 80 is pivotally mounted on a stationary pivot pin 84. The lever 80 is provided between its ends with an outwardly extending curved projection 83 and a spring 82 urges the lever 80 with its projection 83 into a cam 85 provided on the inner circumference of the change-over ring 19. It will be noted that depending upon the pivoted position of the lever 80 its abutment face 81 will move in circumferential direction more or less toward the radial abutment 173 on the distance adjusting ring 1 so that the distance adjustment will be blocked sooner or later.

The invention is not limited to the employment of a spring actuated diaphragm mechanism as it is illustrated in the disclosed embodiments. The invention may also be employed in connection with a device for directly forming the diaphragm aperture in dependence of the adjusted guide number and distance and may also be employed in connection with a pressure operated diaphragm mechanism whereby the initial position of the diaphragm may also be the smallest diaphragm aperture contrary to the embodiments described and illustrated hereinbefore.

What we claim is:

1. In a photographic device, such as a camera, having a camera objective and a shutter means, the device comprising in combination:
   (a) an adjustable diaphragm,
   (b) a flash guide number adjusting member provided with a guide number scale,
   (c) a distance adjusting member provided with a distance scale,
   (d) means for adjusting said diaphragm upon adjustment of said two adjusting members and in which the interval spacings of said guide number scale are proportionate to the interval spacings of said distance scale, and
   (e) means forming an abutment arranged in such a position between said two adjustment members that it upon adjustment to one limit value of the diaphragm aperture, preferably to the smallest one, becomes effective to prevent any relative adjustment between said two adjustment members in a direction which would result in an adjustment to an impossible diaphragm value which lies beyond said one limit value of said diaphragm aperture,
   (f) said abutment upon further adjustment of one of said two adjustment members causes the other adjustment member to move with it, whereby the existing limit value of the diaphragm aperture is maintained.

2. In a photographic device, such as a camera, having a camera objective and a shutter means, the device comprising in combination:
   (a) an adjustable diaphragm,
   (b) a flash guide number adjusting member provided with a guide number scale,
   (c) a distance adjusting member provided with a distance scale,
   (d) means for adjusting said diaphragm upon adjustment of said two adjusting members and in which the interval spacings of said guide number scale are proportionate to the interval spacings of said distance scale, and
   (e) means forming an abutment arranged in such a position between said two adjustment members that it upon adjustment to one limit value of the diaphragm aperture, preferably to the smallest one, becomes effective to prevent any relative adjustment between said two adjustment members in a direction which would result in an adjustment to an impossible diaphragm value which lies beyond said one limit value of said diaphragm aperture, and
   (f) means forming another abutment arranged in such a position on said distance adjustment member that a paired arrangement of guide number and distance values is prevented which would amount to a transgression of the other limit value of the diaphragm aperture, such as the greatest possible diaphragm aperture, in a direction of movement which would result in a not obtainable diaphragm ratio.

3. In a photographic device as claimed in claim 1, including a control cam on said guide number adjusting member, said control cam being constructed to perform a compensation between a non-linear guide number scale and the linear adjusting steps of said means for adjusting said diaphragm.

4. In a photographic device, the device comprising in combination: an adjustable diaphragm, a flash guide number adjusting member provided with a guide number scale, a distance adjusting member provided with a distance scale, means for adjusting said diaphragm upon adjustment of said two adjusting members and in which the intervals of the guide number scale wholly or partially correspond to the nonuniform intervals of the distance scale, that an abutment system is provided in addition to the diaphragm abutments which is controlled in dependence of the guide number and which automatically limits the distance values so as to prevent the formation of a wrong or an impossible diaphragm value, and that the one stop of said abutment system is formed between the distance adjusting ring and the guide number adjusting ring, while the other stop of said abutment system is movable in dependence of the guide number adjustment.

References Cited in the file of this patent

UNITED STATES PATENTS

| | | |
|---|---|---|
| 2,953,978 | Rentschler | Sept. 27, 1960 |
| 2,993,425 | Rentschler | July 25, 1961 |
| 3,029,718 | Rentschler | Apr. 27, 1962 |